(12) United States Patent
Osanai et al.

(10) Patent No.: US 6,360,298 B1
(45) Date of Patent: Mar. 19, 2002

(54) LOAD/STORE INSTRUCTION CONTROL CIRCUIT OF MICROPROCESSOR AND LOAD/STORE INSTRUCTION CONTROL METHOD

(75) Inventors: Takeki Osanai, Ebina (JP); Johnny K. Szeto, San Jose; Kyle Tsukamoto, Santa Clara, both of CA (US)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/502,550

(22) Filed: Feb. 10, 2000

(51) Int. Cl.$^7$ .............................................. G06F 12/00
(52) U.S. Cl. ........................... 711/133; 24/118; 24/126; 24/134; 24/137; 24/141; 24/143
(58) Field of Search ....................... 711/118, 133–137, 711/126, 141–143; 365/189.05; 210/50

(56) References Cited

U.S. PATENT DOCUMENTS 5,671,444 A * 9/1997 Akkary et al. ................. 710/52
5,680,572 A * 10/1997 Akkary et al. ............... 711/126
5,982,675 A * 11/1999 Fujimoto ................ 365/189.05

* cited by examiner

Primary Examiner—Than Nguyen
(74) Attorney, Agent, or Firm—Gray Cary Ware & Freidenrich LLP (57) ABSTRACT

A load/store instruction control method of a microprocessor according to the present invention has a feature as follows. The circuit implements non-blocking cache which does not allow a pipeline process of a microprocessor to stop even if a cache miss by load/store instructions occurs. When the load instruction for a no-write allocate area directly storing a store-data to a lower layer memory in a cache hierarchy at time of a cache-miss initiates the cache-miss, and a subsequent store instruction initiates the cache-miss for the same cache line as that of the preceding load instruction, during a refill process of the DCACHE by the preceding load instruction or after the refill process, the store-data by the subsequent store instruction is stored to a corresponding cache line. Consequently, unconformity of data such as only the lower layer memory in the cache hierarchy holds a new data and only the DCACHE holds an old data does not occur.

16 Claims, 8 Drawing Sheets

FIG.1 BLOCK DIAGRAM

FIG.2
MEMORY COHERENCY PROBLEM

FIG.3 PRIOR ARTS

(1) LD R1, 0 × 0(R2) // MISS ON NWA AREA -> LINE REFILL
(2) SD R3, 0 × 0(R2) // SAME ADDRESS AS (1) -> HIT. THE LINE BECOMES DIRTY
(3) LD R4, 0 × 0(R5) // MISS. SAME INDEX AS (1) / (2). REPLACE THE LINE OF
            // (2). DIRTY WRITE BACK IS INITIATED.
(4) SD R5, 0 × 0(R2) // MISS. SAME ADDRESS AS (2).

FIG.10

LOAD/STORE INSTRUCTION CONTROL CIRCUIT OF MICROPROCESSOR AND LOAD/STORE INSTRUCTION CONTROL METHOD

BACKGROUND OF THE INVENTION

1. Field of the Invention

The present invention relates to a load/store instruction control circuit of a microprocessor which has a no-write allocate area writing directly a store-data by a store instruction into an external memory or a cache memory of a lower layer when a store instruction initiates a cache-miss, and which implements a non-blocking cache not allowing processes of a pipeline to stop even in case of a cache-miss.

2. Related Background Art

Because it takes a long time that a processor accesses a main memory (an external memory), a cache memory being able to access at a high speed is often provided between the processor and the external memory. A portion of data, which has been stored or should be stored to the external memory, is copied to the cache memory.

An LSU (Load Store Unit) in the processor detects whether or not a corresponding data exists in a cache memory when it executes a load instruction. If the corresponding data exists in the cache memory, the LSU reads out the data from the cache memory. When the LSU executes a store instruction, it stores a store-data to the cache memory instead of the external memory.

Figure 1:
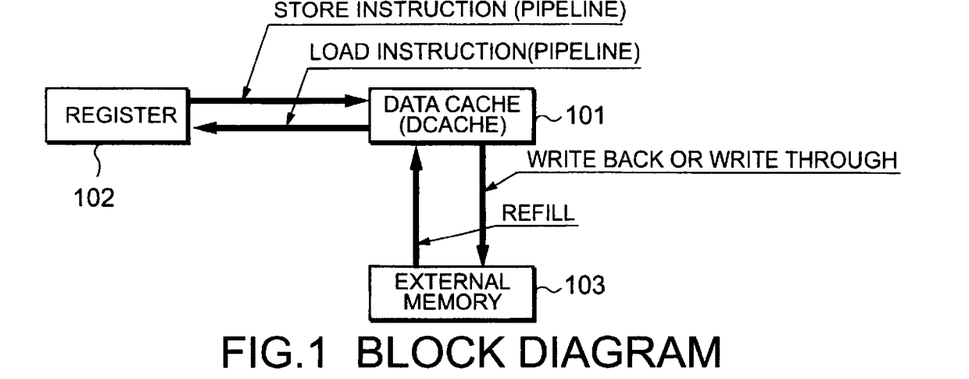
FIG. 1 is a diagram showing an operation of the LSU in the conventional processor.

FIG. 1 is a diagram showing an operation of the LSU in the conventional processor. When the load instruction is issued, the LSU detects whether or not data to be loaded is stored to a data cache (DCACHE) 101. If the data has been stored to the DCACHE 101, the LSU reads out the data in order to store to a register 102. If the load data is not yet stored to the DCACHE 101, the LSU reads out the data from the external memory. If the store instruction is issued, the LSU stores a value of the register 102 to the DCACHE 101.

There is sometimes the case that a no-write allocate area (space) is provided in a memory space of the main memory of the processor. When a cache-miss of the load instruction occurs in the no-write allocate area, a refill process for the DCACHE is carried out. When a cache-miss by the store instruction occurs in the no-write allocate area, the refill process for the DCACHE is not carried out. The data of the store miss is sent only to the external memory. That is, in such a case, the DCACHE is not updated.

On the other hand, as a manner accessing to the DCACHE, a non-blocking manner is known. The non-blocking has a feature in which the pipeline of the processor does not stop even if the cache-miss occurs.

When the cache access for the above-mentioned no-write allocate area is conducted by the non-blocking cache manner, the following problem may occur.

Figure 2:
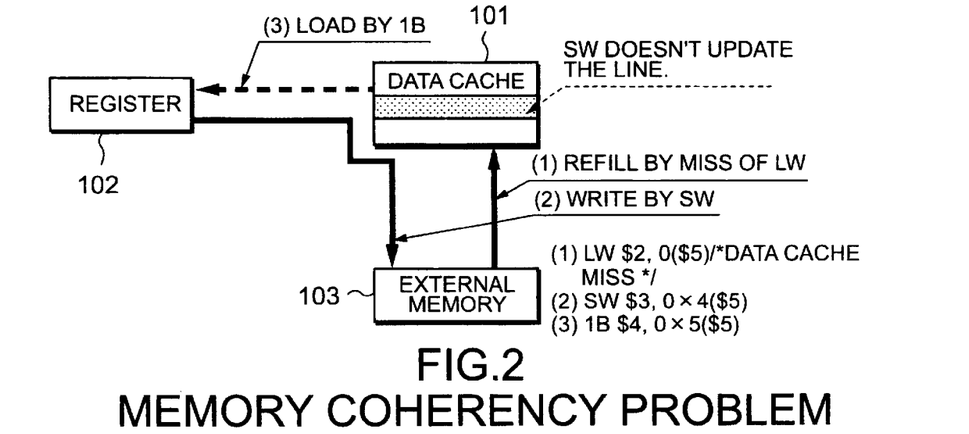
FIG. 2 is a conventional data flow in case conducting the cache access in succession by the non-blocking manner for the same line in the no-write allocate area.

FIG. 2 is a conventional data flow in case conducting the cache accesses in succession by the non-blocking manner for the same line in the no-write allocate area. FIG. 2 shows an example that (1) one word data corresponding to an address generated by adding zero to a content of a general purpose register of an entry number 5 is loaded to a general purpose register of an entry number 2, (2) one word data of a general purpose register of an entry number 3 is stored to an address generated by adding four to a content of the general purpose register of the entry number 5, (3) one byte data corresponding to an address generated by adding five to a content of the general purpose register of the entry number 5 is loaded to the general purpose register of the entry number 4.

When the lw (load word) instruction of (1) misses on the cache in the no-write allocate area, a refill process of a corresponding cache line is carried out. However, in case of the non-blocking cache, the pipeline does not stop.

Next, the sw (store word) instruction of (2) accesses the same cache line of the DCACHE 101 as (1). At this time, because a word data being a target of the sw is not yet refilled to the DCACHE 101, the cache-miss occurs. Accordingly, data to be stored is sent to the external memory 103 without being stored to the DCACHE 101. The lw miss data of (1) is refilled to the corresponding cache line.

When executing the lb (load byte) instruction of the next (3), if the refill process initiated by the lw instruction of (1) has finished, the lb instruction of (3) hits on the cache. However, because the store-data by the store instruction of (2) is not yet stored to the corresponding cache line, the lb instruction of the (3) reads out an old data.

Figure 3:
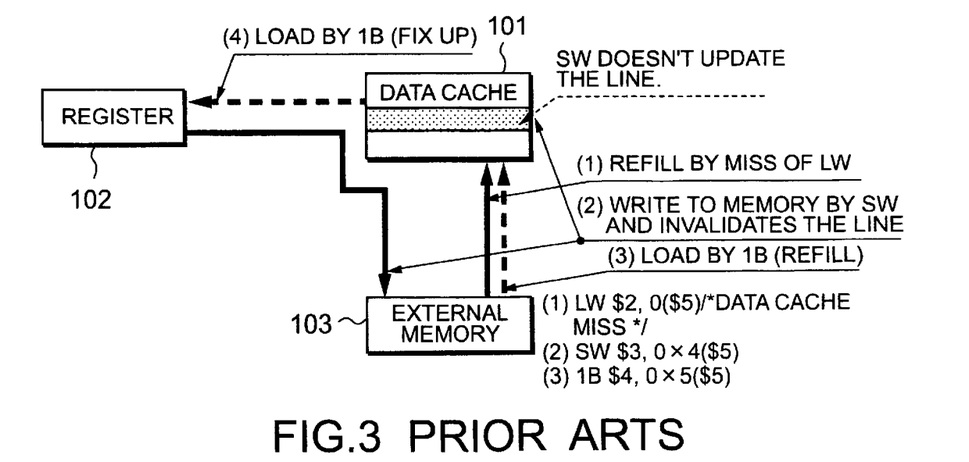
FIG. 3 is a conventional data flow which dissolves an undesirable problem of FIG. 2.

On the other hand, FIG. 3 is a conventional data flow which dissolves an undesirable problem of FIG. 2.

In FIG. 3, when a lw instruction of (1) initiates the cache-miss, the refill process of the corresponding cache line is carried out. In case of the non-blocking cache, the pipeline does not stop. A sw instruction of (2) accesses the same cache line as (1). At this time, because a word data being a target of the sw is not yet stored to the DCACHE 101, the cache-miss occurs.

After then, data of one cache line is loaded to the DCACHE 101 by the refill process by the lw instruction of (1). Before a lb instruction of (3) is executed, some kind or another means occupies the DCACHE 101 in order to invalidate the cache line refilled by (1). Because the cache line is invalidated, the lb instruction of (3) initiates the cache-miss. Therefore, the refill process is carried out in order to read out a latest data that the sw instruction of (2) has stored to the memory.

Thus, according to the method of FIG. 3, it is possible to read out the latest data that the immediately preceding store instruction has stored to the memory. However, according to the method of FIG. 3, when a plurality of cache-misses occur sequentially, a complicated control is necessary to avoid a stop of the pipeline. That is, when the cache-misses for the same cache line in the no-write allocate area occurs sequentially, the control which assures an order of bus read/write becomes complicated. Because of this, structure of the processor becomes complicated, and it takes a long time to verify the operation of the processor. Furthermore, because the number of gate stages on paths in the inside of the processor increases with the complexity, there is a likelihood that a control block of the load/store instruction becomes a critical path.

SUMMARY OF THE INVENTION

An object of the present invention is to provide a load/store instruction control circuit and a load/store instruction control method being able to assure a consistency between data of a cache memory and data of an external memory, when load/store instructions for a no-write allocate area in a non-blocking cache manner conflict with each other.

In order to achieve the foregoing object, a load/store instruction control circuit of a microprocessor which is able to access a cache memory storing a portion of data stored to an external memory or read out from the external memory, comprising:

load/store same line miss detecting means for detecting that a load instruction for a no-write allocate area storing data directly to a lower layer memory in a cache hierarchy initiates a cache-miss, and a subsequent store instruction initiates the cache-miss for the same cache line as the preceding load instruction, when a non-blocking cache that a pipeline process of a microprocessor does not stop even if the cache-miss of load/store instructions occurs is implemented;

temporary storing means for temporarily storing a store-data by said subsequent store instruction when the same cache line miss by said load/store same line miss detecting means is detected, and load/store control means for storing to a corresponding cache line the store-data stored to said temporary storing means during a refill process for the cache line by the preceding load instruction or after the refill process.

According to the present invention, when a load instruction for the no-write allocate area initiates a cache-miss, and a subsequent store instruction initiates the cache-miss for the same cache line as a preceding load instruction, during a refill process to the cache line by the preceding load instruction or after the refill process has finished, the store-data by the store instruction is stored to the corresponding cache line, even if the store instruction targets the no-writer allocate area. Because of this, it is possible to reliably assure a consistency of data between the cache memory and the external memory.

Furthermore, when the dirty write back conflicts with the write process to the external memory of the store-data, because the dirty write back is executed on a higher priority than the write process to the external memory, a problem that new data written to the external memory is overwritten with the old data by the dirty write back is dissolved.

DESCRIPTION OF THE PREFERRED EMBODIMENTS

A microprocessor according to the present invention is described in detail with reference to the attached drawings as follows.

(First embodiment)

Figure 4:
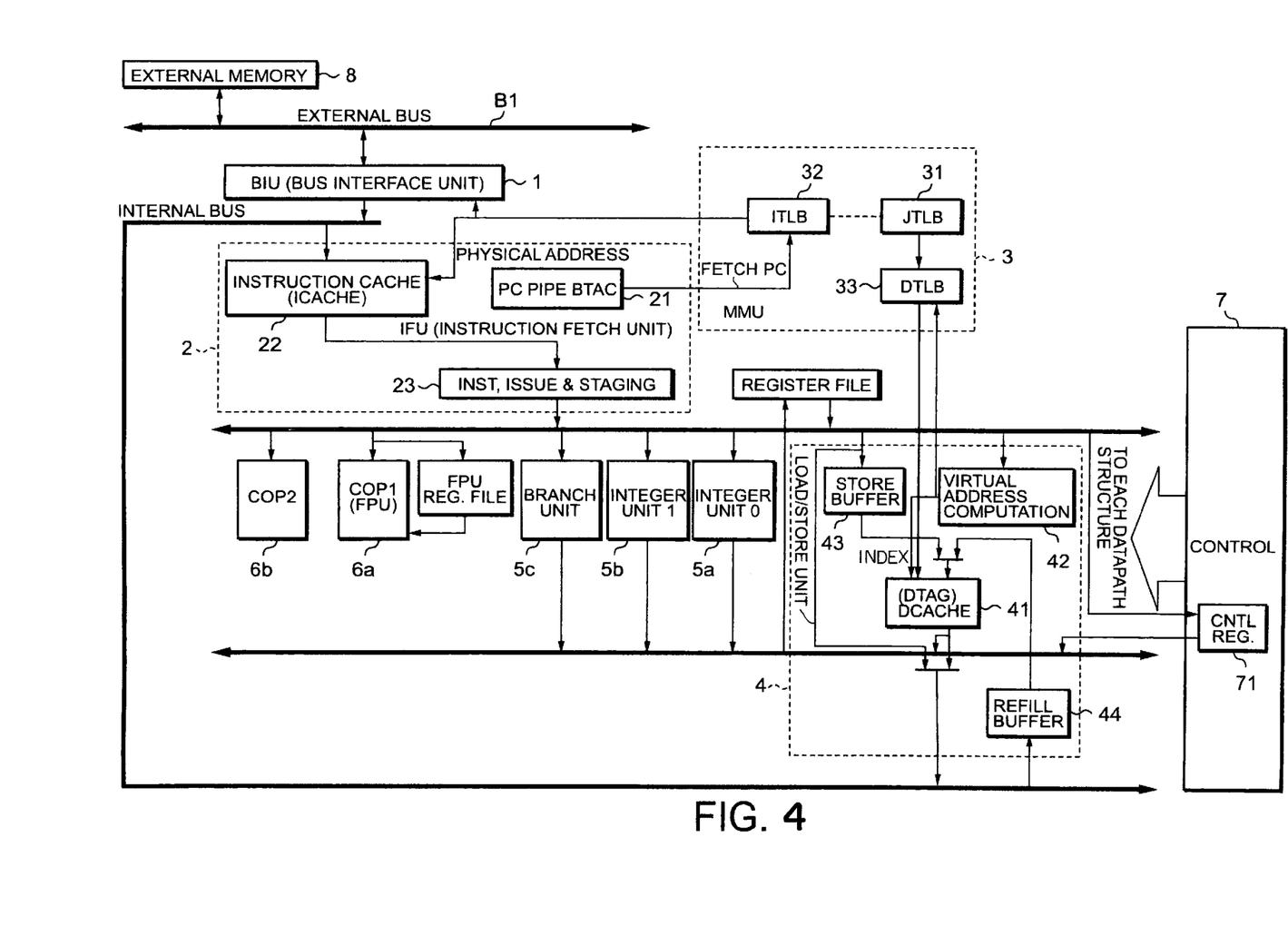
FIG. 4 is a block diagram showing inside configuration of the microprocessor according to the present invention.

FIG. 4 is a block diagram showing inside configuration of the microprocessor according to the present invention. The microprocessor of FIG. 4 comprises a Bus Interface Unit 1 connected to an external bus B1, an IFU (Instruction Fetch Unit) 2 which fetches instructions executed by a processor, an MMU (Memory Management Unit) 3 which converts virtual addresses to physical addresses, an LSU (Load Store Unit) 4 which executes instructions relating to load/store, a plurality of executing units 5a, 5b and 5c which execute instructions other than load/store, FPUs (Floating Point Units) 6a, 6b and 6c which execute floating radix point calculation, a Control Logic 7 which controls each block in the processor.

The IFU 2 includes a PC-pipe 21 which generates a PC (Program Counter) by referring to the BTAC which stores branch address of the instruction such as a branch instruction, an ICACHE (Instruction Cache memory) 22 which temporarily stores the instructions, and an Instruction issue & Staging block 23 which recognizes the type of the instructions and selects an executing unit to execute the recognized instructions.

MMU 3 has three TLBs (Translation Lookaside Buffers) which convert the virtual addresses to physical addresses. Address converting information needed by the processor, such as a physical page number and memory protection information, is written to the TLBs. Based on this information, the MMU 3 executes the conversion to the physical address.

Three types of the TLBs in the MMU 3 are a JTLB (Joint Translation Lookaside Buffer) 31, an ITLB (Instruction Translation Lookaside Buffer) 32, and a DTLB (Data Translation Lookaside Buffer) 33.

The ITLB 32 and the DTLB 33 are called a micro TLB as a generic name. The ITLB 32 is a specific TLB connected directly to a datapath of the virtual address of the instructions. The DTLB 33 is a specific TLB connected directly to datapath of the virtual address of data. These TLBs have few number of entries, and execute address conversion at high speed. A portion of a conversion table generated by the JTLB 31 is transferred to the ITLB 32 or the DTLB 33 as necessary.

The JTLB 31 is controlled by the software, while the coherency between micro TLBs and the JTLB is maintained by the hardware. The processor issues an exception when there is no conversion table in the JTLB 31. An exception handler searches the corresponding page from a page table of an OS and writes the information of the conversion table 100 into the JTLB 31.

The LSU 4 has a DCACHE (Data Cache Memory) 41 which temporarily stores data read out from and written into the external memory, an address generator (Virtual Address Computation) 42 which generates the virtual address necessary to the access to the DCACHE 41, a store buffer (temporary storing means) 43 which temporarily stores data to be stored to the memory by the store instruction, and a refill buffer 44 which allows data sent from the external memory 8 to wait before storing to the DCACHE.

The store buffer 43 is, for example, used to temporarily store the store-data by the store instruction when the store access for the DCACHE 41 conflicts with the other access such as read-out of data by the load instruction, on the DCACHE 41).

At time point when the store instruction has written data to the store buffer 43, a store process in the pipeline is completed. Because of this, it is possible to improve performance of the pipeline by providing the store buffer 43.

The refill buffer 44 is provided in order to avoid stop of the pipeline. In case that the non-blocking cache is implemented, even if the cache-miss occurs, the pipeline does not stop. Because of this, there may be a likelihood that access to the DCACHE 41 by the load/store instructions of the pipeline conflicts with access to the DCACHE 41 by the refill process, on the DCACHE 41. In this case, the refill data is waited in the refill buffer 44 until the data becomes possible to use a time slot of the DCACHE 41.

Next, an operation of the microprocessor shown in FIG. 4 will be explained as follows. First of all, the IFC 2 fetches the instructions based on the PC generated by the PC pipe 2. The PC is a virtual address.

The ITLB 32 converts the PC from the virtual address into a physical address. The converted physical address is used to search for the ITAG in the ICACHE 22. That is, the physical address is used to detect whether or not the instruction indicated by the PC exists in the ICACHE 22. When the instruction indicated by the PC does not exist in the ICACHE 22, that is, in case of the cache-miss, access to the external memory 8 not shown is carried out by using the physical address.

When the cache-miss occurs, information which informs of the occurrence of the cache-miss and the physical address information are delivered to a Control Logic in the BIU 1. The BIU 1 accesses the external memory based on these information. When the access to the external memory finishes, signal which informs of acquisition of the cache line is applied to the IFU 2. The IFU 2 writes to the ICACHE 22 data obtained by access to the memory. At the same time, among the instructions included in the refilled cache line, an instruction indicated by the PC and on a specific occasion, several instructions succeeding to the instruction indicated by the PC is applied to the Instruction issue & Staging block 23.

On the other hand, when the instruction indicated by the PC exists in the ICACHE 22, the corresponding instruction in the ICACHE 22 and on a specific occasion, several instructions succeeding to the instruction indicated by the PC is applied to the Instruction issue & Staging block 23.

The Instruction issue & Staging block 23 discriminates types of the instructions, and determines the execute unit which executes the instruction, such as the LSU 4 or the other execute unit. In this case, the Instruction issue & Staging block 23 selects dynamically the execute unit in accordance with unoccupied condition of each execute unit.

For example, when the discriminated instruction is the load/store instruction, only the LSU 4 can execute the instruction. Because of this, the Instruction issue & Staging block 23 sends the instruction to the LSU 4 when the LSU 4 is ready to execute the instruction.

The processor according to the present embodiment can select either of "copy back" or "write through" as a process in case of cache-hit, and can select either of "write allocate" or "no-write allocate" as a process in case of cache-miss. By combining the former and the latter, four types of combinations are obtained. Hereinafter, these combinations will be explained in detail.

(1) copy back with allocation on write a) hit of store instruction for the DCACHE 41:

The store-data by the store instruction is written to the DCACHE 41. Any process is not carried out for the external memory 8. That is, the line in the DCACHE 41 becomes a dirty state in which the DCACHE 41 owns a new data, and the external memory 8 owns an old data.

b) miss of store instruction for the DCACHE 41:

After the refill process is carried out for the DCACHE 41, the store-data by the store instruction is written to the DCACHE 41. Although the external memory applies the refill data to the DCACHE 41, the store-data by the store instruction is not stored to the external memory. Also in this case, the line in the DCACHE 41 becomes dirty.

(2) copy back without allocation on write a) hit of store instruction for the DCACHE 41:

The store-data by the store instruction is written to the DCACHE 41. Any process is not carried out for the external memory 8. That is, the line in the DCACHE 41 becomes dirty.

b) miss of store instruction for the DCACHE 41:

Any process is not carried out for the DCACHE 41. The store-data by the store instruction is written to the external memory 8.

(3) write through with allocation on write:

a) hit of store instruction for the DCACHE 41:

The store-data by the store instruction is written to both of the DCACHE 41 and the external memory 8.

b) miss of store instruction for the DCACHE 41:

After a refill process is carried out for the DCACHE 41, the store-data by the store instruction is written to both of the DCACHE 41 and the external memory 8. (4) write through without allocation on write:

a) hit of store instruction for the DCACHE 41:

The store-data by the store instruction is written to both of the DCACHE 41 and the external memory 8.

b) miss of store instruction for the DCACHE 41:

Any process is not carried out for the DCACHE 41. The store-data by the store instruction is written to the external memory 8.

The first embodiment has a feature in which consistency of memory is assured in case that the no-write allocate of (2) or (4) among the above (1)–(4) is selected and non-blocking cache which allows the process of the pipeline not to stop is implemented.

Figure 5:
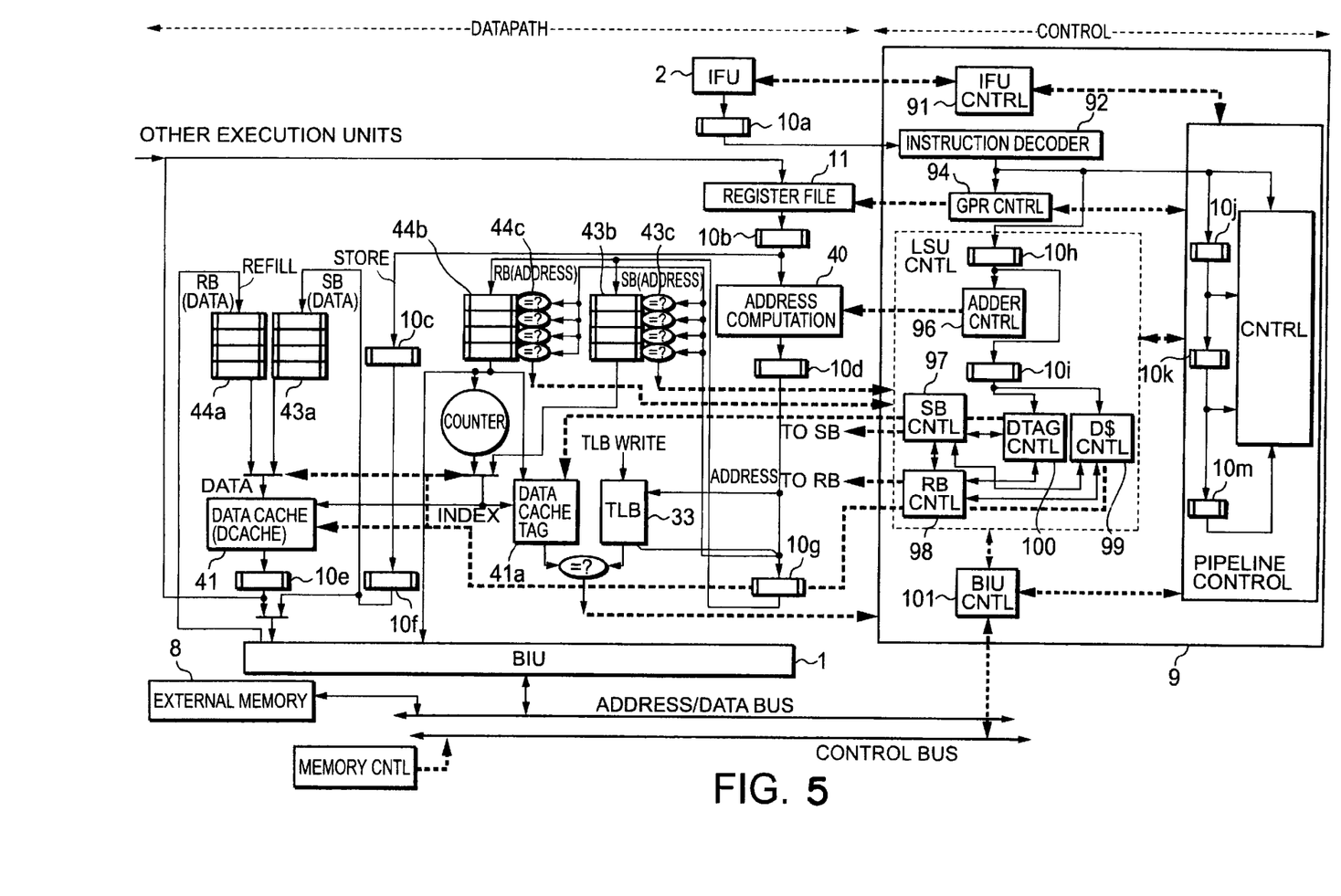
FIG. 5 is a block diagram showing an internal configuration of the LSU of FIG. 4.

FIG. 5 is a block diagram showing an internal configuration of the LSU 4 of FIG. 4. A Control 9 of FIG. 5 generates a control signal applied to a Datapath in accordance with instruction sets. The Datapath releases data in accordance with the control signal from the Control 9.

In FIG. 5, each line connected to the Control 9 and the Datapath expresses the control signal. Usually, the control signals are applied from the Datapath to the Control 9. The control signals, which are applied from the Datapath to the Control 9 and not shown in FIG. 5, also exist. For example, when the pipeline process stops in accordance with the cache-miss of the ICACHE 22, the miss signal from the TAG of the ICACHE 22, which constitutes a portion of the Datapath, is applied to the Control 9 in order to allow the pipeline process to stop.

In FIG. 5, a block indicated by reference numbers 10$a$, 10$b$, . . . , 10m expresses a register structure separating each stage executing the pipeline process. These blocks 10$a$, 10$b$, . . . , 10$m$ are constituted by a circuit including flip-flops and latches, and performs read/write processes. Hereinafter, the blocks 10$a$, 10$b$, . . . , 10$m$ are called pipeline registers as a generic name.

The IFU 2 stores a fetched instruction in the pipeline register 10 based on control of the IFU Control 91. The instructions are sent from the pipeline register 10$a$ to the Instruction Decoder 92. The Instruction Decoder 92 generates a transitive control signal necessary to a discrimination and a process of the instructions. The reason why the transitive control signals are generated is because it is quantitatively and qualitatively impossible to generate all the control signals by the Instruction Decoder 92. The Instruction Decoder 92 generates more abstract signals than control signals of a calculator.

When the Instruction Decoder 92 acknowledges that the fetched instructions are the load/store instructions, the control signals are sent to the corresponding Control Logic block. That is, as shown in FIG. 5, the control signals are sent to a Pipeline Control 93, a GPR (General Purpose Register) 94, and an LSU (load/store control means) 95.

In the Pipeline Control 93 and the LSU Control 95, the instructions and the control signals flows in sync with stages of the data flow. Because of this, the pipeline registers 10a, 10b, . . . , 10m are provided for both of the Control 9 and the Datapath.

The Pipeline Control 93 controls flow of the pipeline in accordance with conditions of the inside of the Pipeline register 10a, 10b, . . . , 10m. For example, when a resource hazard occurs in the calculator, a process which allows the pipeline to stop is performed.

The LSU Control 95 generates a control signal necessary to execute the load/store instruction. In the LSU Control 95, an address Control 96 which controls the address generator 40, an SB Control 97 which controls the store buffer 43, an RB Control 98 which controls the refill buffer 44, D$ Control 99 which controls the DCACHE 41, and DTAG Control 100 which controls the DTAG 41a are provided.

The LSU of FIG. 5 has a store buffer 43 and a refill buffer 44. These buffers have data portions 43a and 44a, and address portions 43b and 44b, respectively.

The store buffer 43 is provided in order to allow the store-data to wait, when the DCACHE 41 is occupied by something or other, and the store instruction cannot store the data to the DCACHE 41. A destination address information for store to the DCACHE 41 is stored to an address portion 43b in the store buffer 43.

There is a case that data to be stored to the DCACHE 41 is not yet stored and the data exists in the store buffer 43, when the load instruction is going to read out the data stored by the preceding store instruction. In this case, the load instruction has to read out the data in the store buffer 4 by using some kind or another means.

So, in order to detect whether or not the load instruction is going to read out the data that the preceding store instruction has stored to the DCACHE 41, an address comparator 43c is provided for the address portion 43b of the store buffer 43. The address comparator 43c compares a content of the store buffer 43 with the load-address by the load instruction in the pipeline, in order to detect whether or not data to be stored is stored to the DCACHE 41.

On the other hand, a data portion 44a of the refill buffer 44 is used to allow data sent from the external bus via the BIU (Bus Interface Unit) to wait before the data is written to the DCACHE 41 when the cache refill by the cache-miss has occurred.

Here, the case which allows data to wait in the refill buffer 44 is more specifically the case that the DCACHE 41 is occupied by something or other when data has been sent to the DCACHE 41.

Because the present embodiment assumes the non-blocking cache, even if the cache-miss occurs when executing the load/store instruction, the pipeline does not stop. Because of this, when the refill data reaches the DCACHE 41 from the external bus, there is a likelihood the load/store instructions are in process of access to the DCACHE 41. In this case, the refill data is stored to the data portion 44a of the refill buffer 44 and wait until the DCACHE 41 is released.

The address portion (address storing means) 44b of the refill buffer 44 is generally called as an address queue. The address portion 44b is an inevitable constituent in the implementation of the non-blocking cache. When the load/store instructions initiate the cache-miss, the missed address is stored to the address portion 44b of the refill buffer 44. Because of this, by the address portion 44b of the refill buffer 44, it is possible to know a destination address for access by the load/store instructions in pending because of the cache-miss. A content of the address portion 44b of the refill buffer 44 is sent to the external bus via the BIU 1, and is used for memory access for the refill.

The address portion 44b of the refill buffer 44 has also an address comparator (address coincidence detecting means) 44c, and checks whether or not a destination address for access by the load/store instructions in the pipeline coincides with a destination address for access by the load/store instructions in pending because of misses.

When the load/store instruction of the pipeline accesses the same address as that in pending, the load/store instruction enters in a vacant entry of the refill buffer 44 as a cache-miss. The load/store instruction waits a process of the cache-miss of the preceding same address. Conceptually, only once of the refill process is necessary for a plurality of cache-misses for the same address. Because of this, it is general to avoid occurrence of a plurality of bus requests to the same address by using a result of the address comparator 44c.

As shown in FIG. 5, the address portion 44b of the refill buffer 44 is connected to the DCACHE 41 and the DTAG 41a. On the occasion that writes the refill data for the DCACHE 41, an entry for refill is designated for the DCACHE 41 and the DTAG 41a, and address for refill is applied to the DTAG 41a.

The refill buffer 44 and the store buffer 43 are also controlled by the Control 9 of FIG. 5. The Control 9 controls each of the buffers, and also performs management of the states. Here, the management of the stages is to regulate necessary states, to generate necessary requests such as a bus read request or a write request to the DCACHE 41, and to change individual states.

Conventionally, as shown in FIG. 2 and FIG. 3, when the load instruction initiates the cache-miss for addresses in the no-write allocate area, and the subsequent store instruction initiates the cache-miss for the same address, the store-data by the store instruction has been stored only to the main memory (external memory), without being stored to the DCACHE 41. On the other hand, the first embodiment has a feature in which in case of implementing the non-blocking cache, the store-data of store miss is written to the cache line of the DCACHE 41 refilled by the preceding load miss when the load instruction initiates the cache-miss for the address in the no-write allocate area, and the subsequent store instruction initiates the cache-miss for the same address.

That is, even if the no-write allocate is selected, the present embodiment temporarily handles as write allocate. To act as write allocate is only store miss that occurred to the same line as the preceding load miss. Therefore, unconformity of data, in which only the external memory 8 holds a new data, and the DCACHE 41 holds an old data, does not occur.

(Second Embodiment)

A second embodiment has a feature in which a write buffer is newly provided between the DCACHE 41 and the BIU 12.

Figure 6:
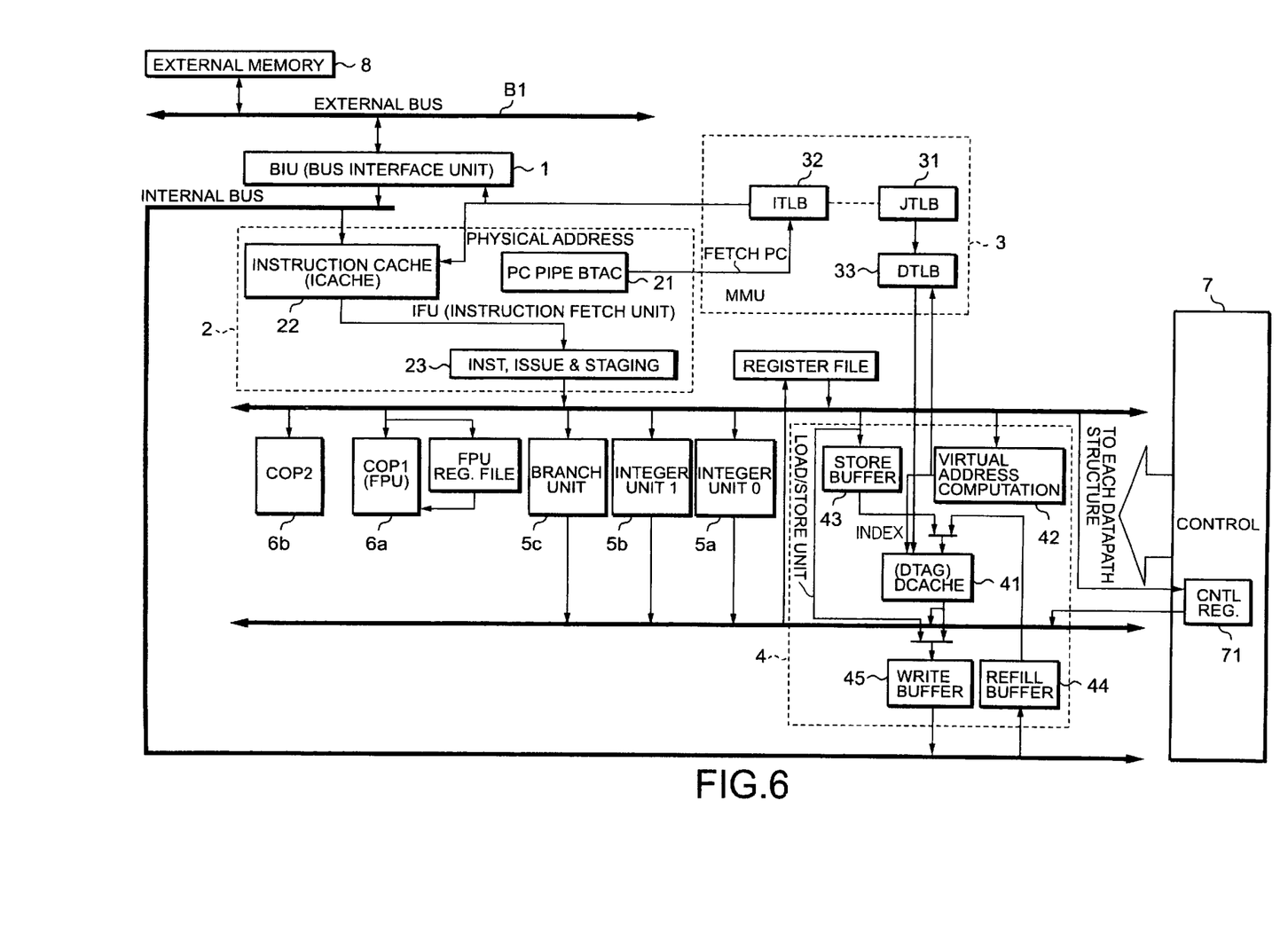
FIG. 6 is a block diagram showing an inside configuration of the second embodiment of the microprocessor.
Figure 7:
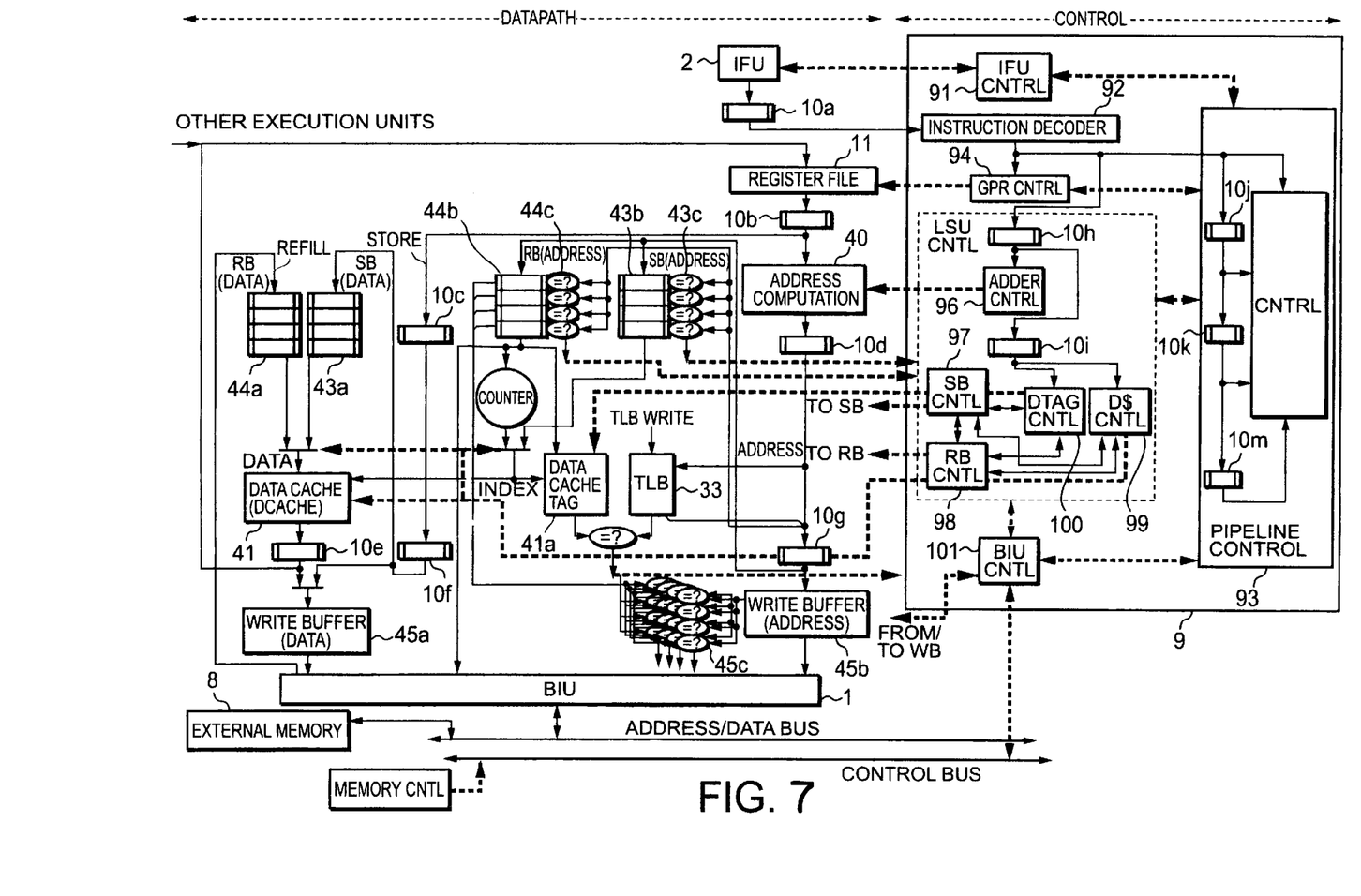
FIG. 7 is a block diagram showing an inside configuration of a LSU in the microprocessor of FIG. 6.

FIG. 6 is a block diagram showing an inside configuration of the second embodiment of the microprocessor, and FIG. 7 is a block diagram showing an inside configuration of a LSU in the microprocessor of FIG. 6. The microprocessor shown in FIG. 6 and FIG. 7 has a write buffer 45 connected between the DCACHE 41 and the BIU 12. Except for the write buffer 45, the microprocessor of the second embodiment is constituted as well as the microprocessor shown in FIG. 4.

The write buffer 45 stores data to write back to the external memory 8. Data stored to the write buffer 45 is, for example, data in case of uncached store and data stored to the DCACHE 41. Because the external bus connected to the external memory 8 operates at a considerably slower speed than an internal frequency of the processor, it is possible to absorb a frequency difference between inside and outside of the processor by providing the write buffer 45. That is, data written to the external memory is waited in the write buffer 45 until the external bus is unoccupied.

The write buffer 45 has a data portion 45a and an address portion 45b as well as the refill buffer 44 and the store buffer 43. Usually, "bus read/write" executes read-operation on a higher priority than write-operation as far as both has no data dependency. The reason is because the processor does not use a result of "bus write", and uses a result of "bus read"; as a result, the time required to the "bus read" has an effect on performance of the processor.

However, when address of the preceding "bus write", coincides with address of the subsequent "bus read", if "bus write" is not executed on a higher priority, "bus read" reads an old data in the external memory 8. Because of this, when "bus read" and "bus write" occurs in sequence, it is necessary to detect whether or not address of "bus read" coincides with address of "bus write".

Therefore, as shown in FIG. 7, an address comparator 45c is provided in order to compare each entry of the write buffer 45 with each entry of the refill buffer 44. When it is determined that each entry of the write buffer 45 coincides with each entry of the refill buffer 44, read-out from the external memory 8 is executed on a higher priority.

Thus, because the second embodiment provides the write buffer 45 between the DCACHE 41 and the BIU 12, it is possible to execute "bus read" on a higher priority than "bus write" when "bus write" conflicts with "bus read". Consequently, an undesirable problem such as an old data is read out from the external memory 8 by mistake is dissolved.

(Third Embodiment)

A third embodiment duplicates address portions of the refill buffer 44 in the first and second embodiments.

Figure 8:
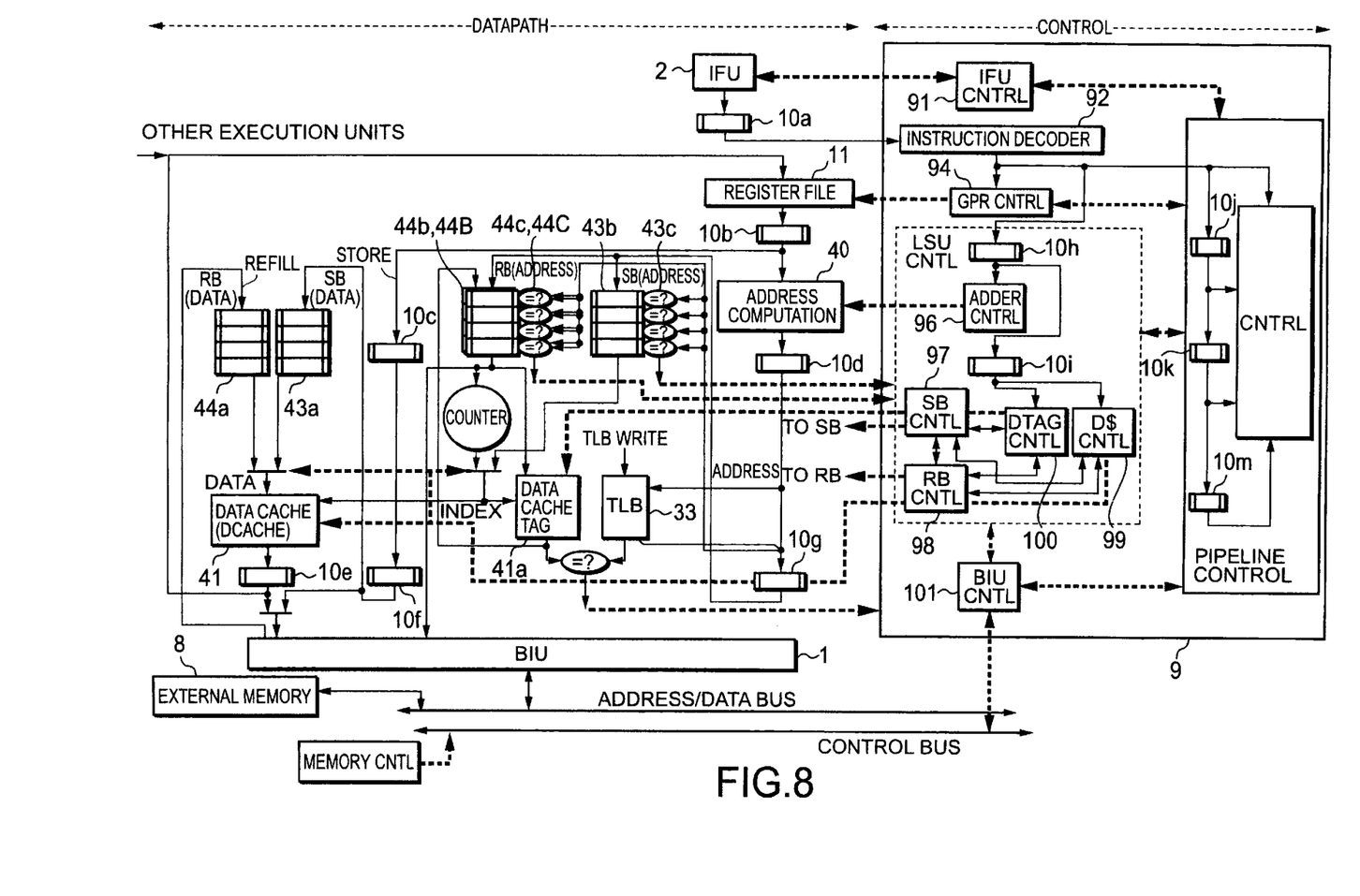
FIG. 8 is a block diagram showing an example duplicating address portions of the refill buffer of FIG. 5.
Figure 9:
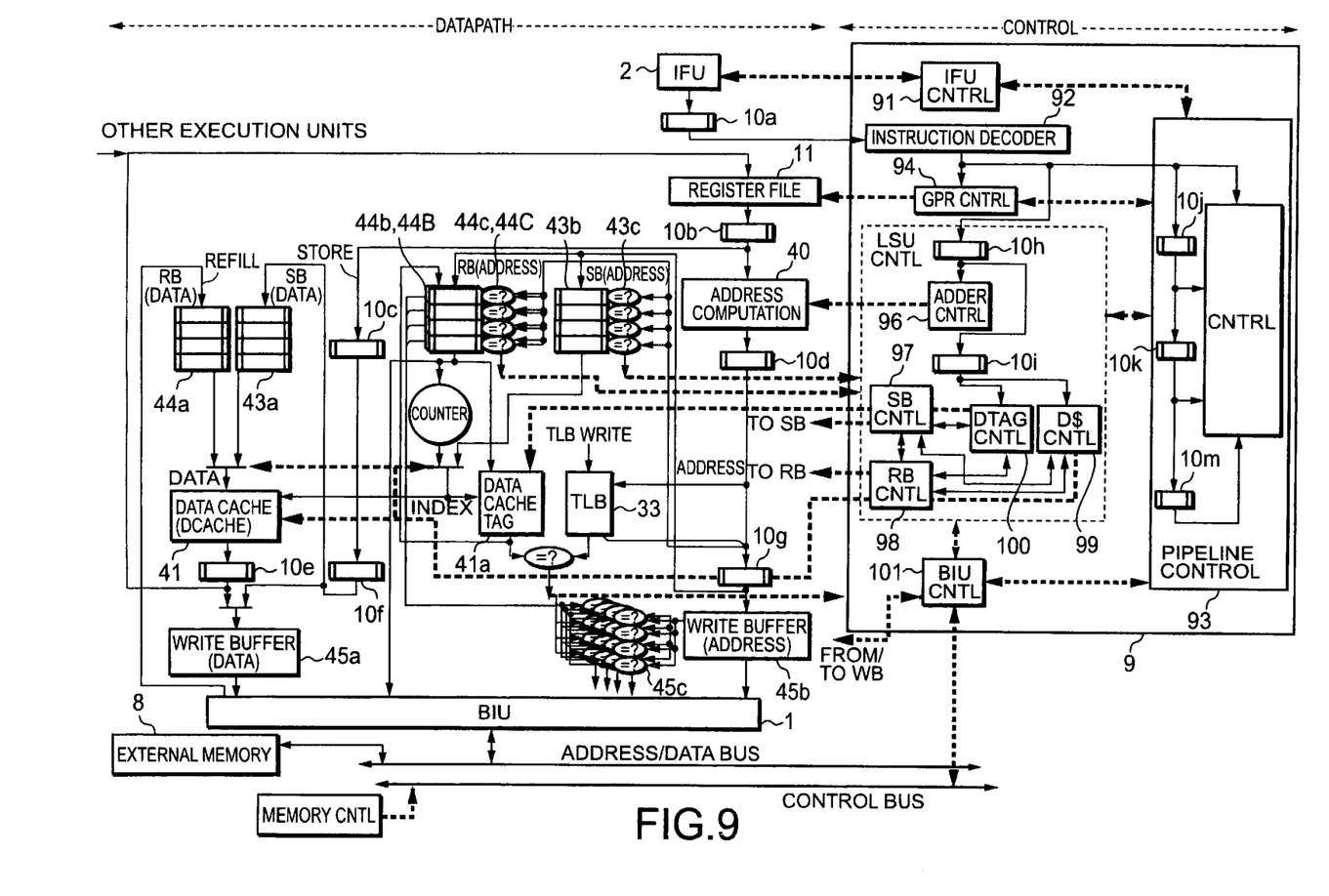
FIG. 9 is a block diagram which adds an address portion of the refill buffer and an address comparator corresponding to the address portion to structure of FIG. 6.

FIG. 8 is a block diagram showing an example duplicating address portions of the refill buffer 44 of FIG. 5. FIG. 9 is a block diagram which adds an address portion 44B of the refill buffer 44 and an address comparator 44C corresponding to the address portion 44B to structure of FIG. 6.

Output of the DTAG 41a is inputted to the address portion 44B added newly. The address comparator 44C corresponding to the address portion 44B compares output of the DTAG 41a with addresses of the pipeline.

Figure 10:
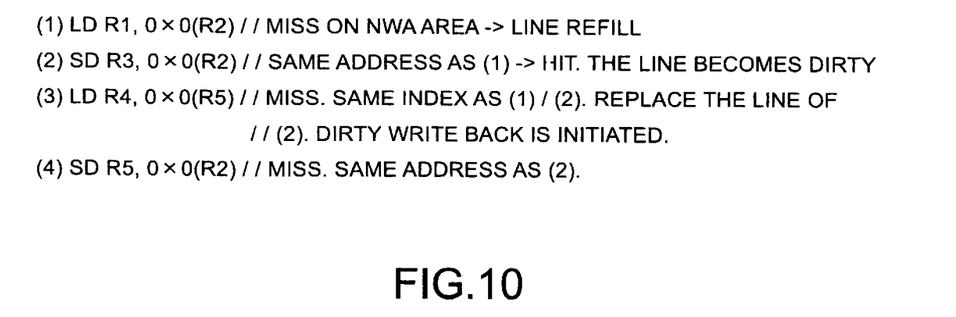
FIG. 10 is a diagram showing an example of the instruction sets executed by the LSU.

FIG. 10 is a diagram showing an example of the instruction sets executed by the LSU 4. Hereinafter, the reason why the address portions of the refill buffer 44 are duplicated is explained on the basis of the instruction sets of FIG. 10.

When the ld (load double word) instruction for the no-write allocate area shown in (1) of FIG. 10 misses in the cache, the refill process of the cache line is carried out. After the refill process has finished, when the sd (store double word) instruction shown in (2) is issued for the same address as that of (1), the sd instruction of (2) becomes cache-hit. Because of this, data is stored to the cache line, and the cache line becomes dirty.

Next, as shown in (3), when the ld instruction is issued for the same index address as that of (1) and (2), replacement of the cache line is carried out; as a result, a "dirty write back" is initiated.

Next, as shown in (4), sd instruction for the same address as that of (2) is issued, the sd instruction misses in the cache.

In case of the instruction sets of FIG. 10, after the ld instruction of (3) has become cache-miss, a process which writes back the cache line set dirty by the sd instruction of (2) to the external memory 8 is performed. This process is called as "dirty write back".

When a priority of the load/store instructions of the pipeline is set higher than that of the "dirty write back", in order to improve performance of the processor, as a priority of events of the DCACHE 41, "dirty write back" initiated by the cache-miss of the ld instruction of (3) is pended, and the sd instruction of (4) is executed on a higher priority.

In case of FIG. 10, because the sd instruction of (4) misses in the cache, and its instruction requires access to the no-write allocate area, the refill process to the DCACHE 41 is not executed. The store-data is directly sent to the BIU 12 or the write buffer 45.

However, because a destination address for store of "dirty write back" by the sd instruction of (2) coincides with a destination address for store by the sd instruction of (4), if "dirty write back" is not executed prior to a store to the external memory by the store instruction, there is a likelihood that a new data stored by the sd instruction of (4) is overwritten by an old data by the sd instruction of (2).

In FIG. 7 and 8, the address portion 44B of the refill buffer 44 and the corresponding address comparator are added one by one. Address of the replaced cache line, that is, output of the DTAG 41a is stored to the added address portion 44B.

When the address comparator 44C determines that address of the store instruction in the pipeline coincides with the address of the address portion of the refill buffer 44, a flag is set an entry corresponding to the address. Until "dirty write back" corresponding to the entry finishes, the store miss data for the corresponding no-write allocate area is not sent to the BIU 12, and is not written to the external memory 8.

Thus, when the preceding "dirty write back" is going to access the same address as the subsequent "bus write", the third embodiment executes the preceding "dirty write back" on a higher priority. Because of this, an undesirable problem that a new data stored to the external memory 8 is overwritten by an old data is dissolved. Except for the case that "dirty write back" conflicts with the subsequent "bus write", because "bus write" is executed by priority, a process of the pipeline is executed on a higher priority than a process of "dirty write back"; as a result, performance of the processor is improved.

In each of the above-mentioned embodiments, examples that the cache memory is not a hierarchical structure has been explained. However, even if the structure of the cache memory is hierarchical, it is possible to apply the present invention as well.

When the cache structure is hierarchical, as processes in case the store miss has occurred in the no-write allocate area, the following three processes are thinkable.

(1) The store-data is written only to a cache memory of a lower layer.

(2) The store-data are written both of the cache memory of a lower layer and the external memory.

(3) The store-data is written only to the external memory.

The present invention is applicable in any of the above (1)–(3)

What is claimed is:

1. A load/store instruction control circuit of a microprocessor which is able to access a cache memory storing a portion of data stored to an external memory or read out from the external memory, comprising:

load/store same line misses detecting means for detecting that a load instruction for a no-write allocate area storing data directly to a lower layer memory in a cache hierarchy initiates a cache-miss, and a subsequent store instruction initiates the cache-miss for the same cache line as the preceding load instruction, when a non-blocking cache that a pipeline process of a microprocessor does not stop even if the cache-miss of load/store instructions occurs is implemented;

temporary storing means for temporarily storing a store-data by said subsequent store instruction when the same cache line miss by said load/store same line miss detecting means is detected, and load/store control means for storing to a corresponding cache line the store-data stored to said temporary storing means during a refill process for the cache line by the preceding load instruction or after the refill process.

2. The load/store instruction control circuit according to claim 1, further comprising:

address storing means for storing destination addresses for access of the load/store instructions initiating the cache-miss when the load/store instructions in the pipeline of the microprocessor initiates the cache-miss, and address coincidence detecting means for detecting whether or not an address stored to said address storing means coincides with the destination address for access of the load/store instructions in said pipeline, wherein said load/store same line miss detecting means detect whether or not the subsequent store instruction initiates the cache-miss for the same cache line as the preceding load instruction.

3. The load/store instruction control circuit according to claim 1, wherein said load/store control means store a store-data stored to said temporary storing means to the corresponding cache line without storing the store-data to the lower layer memory in said cache hierarchy during a refill process for said cache memory by said preceding load instruction or after the refill process, when a "copy back" writing the store-data only to said cache memory in case of the cache-hit of the store instruction is selected.

4. The load/store instruction control circuit according to claim 3, further comprising:

dirty line control means for conducting a write-back of a dirty line to the lower layer memory in said cache hierarchy initiated by a cache line replacement by a cache-miss on a higher priority than a subsequent store miss process to said no-write allocate area.

5. The load/store instruction control circuit according to claim 4, further comprising:

a tag memory in which addresses corresponding to data stored to said cache memory are stored, and an address comparator for detecting whether or not addresses in said tag memory corresponding to said write-back of the dirty line coincide with a destination address for store by the store instruction in the pipeline of said microprocessor, wherein said load/store control means inhibit a write-back to the lower layer memory in said cache hierarchy by the store instruction until the write-back of the dirty line to the lower layer memory finishes, on the occasion that said address comparing means detect a coincidence of a part of address.

6. The load/store instruction control circuit according to claim 3, further comprising:

dirty line control means for conducting a write-back of a dirty line to the lower layer memory in said cache hierarchy initiated by a cache line replacement by a cache-miss on a higher priority than a subsequent store miss process to said no-write allocate area, when both of said write-back of the dirty line and said subsequent store miss process are operations for the no-write allocate area.

7. The load/store instruction control circuit according to claim 3, further comprising:

dirty line control means for conducting a write-back of a dirty line to the lower layer memory in said cache hierarchy initiated by a cache line replacement by a cache-miss on a higher priority than a subsequent store miss process to said no-write allocate area, when said write-back of the dirty line depends on said subsequent store miss process, and both of said write-back of the dirty line and said subsequent store miss process are operations for the no-write allocate area.

8. The load/store instruction control circuit according to claim 1, wherein load/store control means store the store-data stored to said temporary storing means to both of the lower layer memory in said cache hierarchy and the corresponding cache line during a refill process for said cache memory by said preceding load instruction or after the ref ill process, when a "write through" writing the store-data to both of said cache memory and the lower layer memory in said cache hierarchy in case of the cache-hit of the store instruction is selected.

9. A load/store instruction control method of a microprocessor which is able to access a cache memory storing a portion of data stored to an external memory or read out from the external memory, comprising:

a first step for detecting that a load instruction for a no-write allocate area storing data directly to a lower layer memory in a cache hierarchy initiates a cache-miss, and a subsequent store instruction initiates the cache-miss for the same cache line as the preceding load instruction, when a non-blocking cache that a pipeline process of a microprocessor does not stop even if the cache-miss of load/store instructions occurs is implemented;

a second step for temporarily storing a store-data by said subsequent store instruction when the same cache line miss by said first step is detected, and a third step for storing to a corresponding cache line the store-data stored to said second step during a refill process for the cache line by the preceding load instruction or after the refill process.

10. The load/store instruction control method according to claim 9, further comprising:

a fourth step for storing destination addresses for access of the load/store instructions initiating the cache-miss when the load/store instructions in the pipeline of the microprocessor initiates the cache-miss, and a fifth step for detecting whether or not an address stored to said fourth step coincides with the destination address for access of the load/store instructions in said pipeline, wherein said first step detect whether or not the subsequent store instruction initiates the cache-miss for the same cache line as the preceding load instruction.

11. The load/store instruction control method according to claim 9, wherein said third step store a store-data stored to said second step to the corresponding cache line without storing the store-data to the lower layer memory in said cache hierarchy during a refill process for said cache memory by said preceding load instruction or after the refill process, when a "copy back" writing the store-data only to said cache memory in case of the cache-hit of the store instruction is selected.

12. The load/store instruction control method according to claim 11, further comprising:

sixth step for conducting a write-back of a dirty line to the lower layer memory in said cache hierarchy initiated by a cache line replacement by a cache-miss on a higher priority than a subsequent store miss process to said no-write allocate area.

13. The load/store instruction control method according to claim 11, further comprising:

a sixth step for conducting a write-back of a dirty line to the lower layer memory in said cache hierarchy initiated by a cache line replacement by a cache-miss on a higher priority than a subsequent store miss process to said no-write allocate area, when both of said write-back of the dirty line and said subsequent store miss process are operations for the no-write allocate area.

14. The load/store instruction control method according to claim 11, further comprising:

a sixth step for conducting a write-back of a dirty line to the lower layer memory in said cache hierarchy initiated by a cache line replacement by a cache-miss on a higher priority than a subsequent store miss process to said no-write allocate area, when said write-back of the dirty line depends on said subsequent store miss process, and both of said write-back of the dirty line and said subsequent store miss process are operations for the no-write allocate area.

15. The load/store instruction control method according to claim 9, wherein third step store the store-data stored to said second step to both of the lower layer memory in said cache hierarchy and the corresponding cache line during a refill process for said cache memory by said preceding load instruction or after the refill process, when a "write through" writing the store-data to both of said cache memory and the lower layer memory in said cache hierarchy in case of the cache-hit of the store instruction is selected.

16. The load/store instruction control method according to claim 9, further comprising:

a seven step in which addresses corresponding to data stored to said cache memory are stored, and an eighth step for detecting whether or not addresses in said seven step corresponding to said write-back of the dirty line coincide with a destination address for store by the store instruction in the pipeline of said microprocessor, wherein said third step inhibit a write-back to the lower layer memory in said cache hierarchy by the store instruction until the write-back of the dirty line to the lower layer memory finishes, on the occasion that said address comparing means detect a coincidence of a part of address.

* * * * *